United States Patent
Chen et al.

(10) Patent No.: US 10,701,646 B2
(45) Date of Patent: Jun. 30, 2020

(54) WIRELESS SYNCHRONIZATION METHOD, WIRELESS SYNCHRONIZATION SYSTEM AND COMPUTER STORAGE MEDIUM

(71) Applicant: ZTE CORPORATION, Shenzhen, Guangdong Province (CN)

(72) Inventors: Shijun Chen, Shenzhen (CN); Liujun Hu, Shenzhen (CN); Guanghui Yu, Shenzhen (CN); Haitao Lu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 121 days.

(21) Appl. No.: 15/311,428

(22) PCT Filed: Jul. 25, 2014

(86) PCT No.: PCT/CN2014/083075
§ 371 (c)(1),
(2) Date: Dec. 14, 2016

(87) PCT Pub. No.: WO2015/176387
PCT Pub. Date: Nov. 26, 2015

(65) Prior Publication Data
US 2017/0105185 A1 Apr. 13, 2017

(30) Foreign Application Priority Data
May 19, 2014 (CN) .......................... 2014 1 0211419

(51) Int. Cl.
*H04W 56/00* (2009.01)
*G01S 1/02* (2010.01)

(52) U.S. Cl.
CPC ........... *H04W 56/001* (2013.01); *G01S 1/024* (2013.01); *H04W 56/00* (2013.01)

(58) Field of Classification Search
CPC ... H04W 56/001; H04W 56/00; H04W 84/10; H04W 56/0015; H04W 84/20;
(Continued)

(56) References Cited

U.S. PATENT DOCUMENTS

| 2004/0063441 | A1* | 4/2004 | Diao | ........................ G01S 5/02 455/456.1 |
| 2008/0232344 | A1* | 9/2008 | Basu | ...................... G01D 9/005 370/350 |

(Continued)

FOREIGN PATENT DOCUMENTS

| CN | 1378398 A | 11/2002 |
| CN | 1501610 A | 6/2004 |
| CN | 101753462 A | 6/2010 |
| CN | 102868516 A | 1/2013 |

OTHER PUBLICATIONS

Extended European Search Report dated May 19, 2017 for European Patent Application No. 14892836.9.
International Search Report and Written Opinion dated Feb. 27, 2015 for PCT Application No. PCT/CN2014/083075.

*Primary Examiner* — Mohamed A Kamara
(74) *Attorney, Agent, or Firm* — Cantor Colburn LLP

(57) ABSTRACT

The present document discloses a wireless synchronization method and a wireless synchronization system. The method includes: determining a synchronization path between a first node and a second node (S110); and using the synchronization path to synchronize the first node and the second node (S120), herein the synchronization path is composed of one or more segments of visible paths, and the visible path is a direct path which connects two nodes visible to each other. The present document further discloses a computer storage medium.

18 Claims, 3 Drawing Sheets

Determine a synchronization path between a first node and a second node — S110

Use the synchronization path to synchronize the first node and the second node — S120

(58) Field of Classification Search
CPC .. H04B 1/71637; H04B 1/7183; H04B 1/719; H04L 67/1089; H04L 67/1095; H04L 67/104
See application file for complete search history.

(56) References Cited

U.S. PATENT DOCUMENTS

| | | | |
|---|---|---|---|
| 2009/0122782 A1* | 5/2009 | Horn | H04J 3/0679 370/350 |
| 2010/0008351 A1* | 1/2010 | Ashwood-Smith | H04J 3/0661 370/350 |
| 2010/0014560 A1 | 1/2010 | Chong et al. | |
| 2010/0172292 A1 | 7/2010 | Ramachandran et al. | |
| 2013/0132502 A1* | 5/2013 | Stacey | H04W 56/0015 709/208 |
| 2013/0181861 A1* | 7/2013 | Zohar | G01S 11/02 342/118 |
| 2014/0029603 A1* | 1/2014 | Nomura | H04W 56/002 370/350 |
| 2014/0253388 A1* | 9/2014 | Jalali | G01S 5/06 342/458 |
| 2015/0156736 A1* | 6/2015 | Guo | H04W 56/001 370/350 |

* cited by examiner

WIRELESS SYNCHRONIZATION METHOD, WIRELESS SYNCHRONIZATION SYSTEM AND COMPUTER STORAGE MEDIUM

CROSS-REFERENCE TO RELATED APPLICATION(S)

This application is the U.S. National Phase application of PCT application number PCT/CN2014/083075 having a PCT filing date of Jul. 25, 2014, which claims priority of Chinese patent application 201410211419.1 filed on May 19, 2014, the disclosures of which are hereby incorporated by reference.

TECHNICAL FIELD

The present document relates to synchronization technology in the field of communications, in particular to a wireless synchronization method, a wireless synchronization system and a computer storage medium.

BACKGROUND

With the continuous development of communication technology and electronic information technology, positioning technology has been paid more and more attention. high-accuracy positioning need is also more and more obvious, especially high-accuracy positioning and indoor positioning needs.

With regard to Global Positioning System (GPS) positioning technology, due to signal loss and other reasons, a signal becomes weak indoors, making a positioning terminal unable to find enough satellites; a cellular network system cannot achieve sufficient accuracy outdoors or indoors because of the large positioning error, and so it cannot meet a wireless positioning requirement.

Improving wireless positioning accuracy depends mainly on two factors: the synchronization precision of each node that transmits a positioning signal, and the ranging accuracy. The synchronization of a navigation satellite is accomplished by setting up a control station with good space conditions on the ground, the control station and the satellite have a good visual condition therebetween.

In order to solve the indoor high-accuracy positioning problem, we need to establish a wireless positioning system on the ground. Each signal-positioning station of a ground wireless positioning system is located close to the ground, this is susceptible to the sheltering and reflection by a variety of buildings on the ground. Therefore, if an unified control station is used to complete the synchronization between the signal-positioning stations, complex conditions of the ground will lead to poor synchronization accuracy, and ultimately affect the positioning accuracy.

In the prior art, the accuracy of the synchronization between nodes often cannot meet expectations due to the problems of reflection processing and multipath. Therefore, if an improvement to the positioning accuracy is required, it is necessary to solve the problem of improving the accuracy of the synchronization between the nodes that perform positioning processing.

SUMMARY

In view of this, the embodiments of the present document are intended to provide a wireless synchronization method, a wireless synchronization system and a computer storage medium to improve the accuracy of the synchronization between nodes.

In order to achieve the abovementioned objective, the technical solution of the embodiment of the present document is realized as follows:

A first aspect of the embodiment of the present document provides a wireless synchronization method, including:

determining a synchronization path between a first node and a second node; and using the synchronization path to synchronize the first node and the second node;

herein the synchronization path is composed of one or more segments of visible paths;

and the visible path is a direct path which connects two nodes visible to each other.

Alternatively, determining the synchronization path between the first node and the second node includes:

judging whether the second node is a visible node of the first node;

if so, the synchronization path is composed of a visible path connecting the first node and the second node.

Alternatively, determining the synchronization path between the first node and the second node further includes:

the synchronization path is composed of at least two segments of the visible paths connecting the first node, at least one intermediate node and the second node, when the second node is an invisible node of the first node.

Alternatively, the method further includes:

when the path is composed of at least two segments of the visible paths connecting the first node, at least one intermediate node and the second node, determining the synchronization path between the first node and the second node includes:

a step of selecting the intermediate node.

Alternatively, one of the first node and the second node is a synchronization initiating node, and the other one is a synchronization response node;

the step of selecting the intermediate node includes:

in step m, node A inquires whether the synchronization response node is a visible node of node A, if the synchronization response node is the visible node of node A, the method enters step m1; if the synchronization response node is an invisible node of node A, the method enters step m2;

in step m1, node A is taken as the intermediate node, and the step of selecting the intermediate node is ended;

in step m2, node A is taken as the intermediate node, and the visible node of node A is taken as the next node A to be returned to step m;

herein a visible node of the synchronization initiating node is the first node A.

Alternatively, each node corresponds to one synchronization level; the synchronization level is equal to the minimum number of the passed segments of the visible paths from the node to a clock reference point;

when the synchronization level of the synchronization initiating node is higher than that of the synchronization response node, in step m2, the visible node of node A whose synchronization level is lower than that of node A is taken as the next node A to be returned to step m;

when the synchronization level of the synchronization initiating node is lower than that of the synchronization response node, in step m2, the visible node of node A whose synchronization level is higher than that of node A is taken as the next node A to be returned to step m.

Alternatively, one of the first node and the second node is the synchronization initiating node, and the other one is the synchronization response node;

the step of selecting the intermediate node includes:

obtaining by the synchronization initiating node a set of visible nodes of each node in advance; and inquiring the synchronization response node in the set of visible nodes, and determining the intermediate node.

Alternatively, judging whether the second node is the visible node of the first node includes:

inquiring a set of visible nodes of the first node;

determining that the second node is the visible node of the first node when the second node is the node in the set of visible nodes.

Alternatively, when the synchronization path passes through only one intermediate node, using the synchronization path to synchronize the first node and the second node includes:

the intermediate node using the visible path to synchronize with the first node; the second node using the visible path to synchronize with the intermediate node;

or the first node and the second node using the visible path to be synchronized with the assistance of the intermediate node;

when the synchronization path passes through at least two intermediate nodes, using the synchronization path to synchronize the first node and the second node includes:

the intermediate node using the visible path to synchronize with the first node;

the intermediate nodes using the visible path to synchronize with each other;

the second node using the visible path to synchronize with the intermediate node.

Alternatively, one of two nodes that use the visible path for synchronization is a synchronized node, and the other one is a node to be synchronized;

using the visible path to synchronize two nodes includes:

determining a synchronization time;

sending by the node to be synchronized a synchronization message to the synchronized node;

receiving by the node to be synchronized an arrival time of the synchronization message;

measuring by the node to be synchronized an arrival time of a synchronization message sent by the synchronized node; and synchronizing the node to be synchronized with the synchronized node according to the two arrival times;

or determining the synchronization time;

respectively sending by node n−1 and node n+1 the synchronization message to node n;

respectively measuring by node n the arrival times of the synchronization messages sent by node n−1 and node n+1;

calculating by node n a clock difference between node n−1 and node n+1 according to the arrival times;

sending by node n the clock difference to the node to be synchronized; and synchronizing the node to be synchronized with the synchronized node according to the clock difference;

herein node n−1 and node n are the nodes visible to each other; node n and node n+1 are the nodes visible to each other; node n+1 is an invisible node of node n−1.

Alternatively, the synchronization level of node n−1 is lower than that of node n; the synchronization level of node n is lower than that of node n+1; node n+1 is the node to be synchronized; node n−1 is a synchronized node.

A second aspect of an embodiment of the present document provides a wireless synchronization system, including:

a determination unit arranged to determine a synchronization path between a first node and a second node; and a synchronization unit arranged to use the synchronization path to synchronize the first node and the second node;

herein the synchronization path is composed of one or more segments of visible paths;

the visible path is a direct path which connects two nodes visible to each other.

Alternatively, the determination unit includes:

a judgment module arranged to judge whether the second node is a visible node of the first node; and a first determination module arranged to determine that the synchronization path is composed of a visible path connecting the first node and the second node, when the second node is the visible node of the first node.

Alternatively, the first determination module is further arranged to determine that the synchronization path is composed of at least two segments of the visible paths connecting the first node, at least one intermediate node and the second node, when the second node is an invisible node of the first node.

Alternatively, the determination unit further includes:

a selection module arranged to perform a step of selecting the intermediate node when the path is composed of at least two segments of the visible paths connecting the first node, at least one intermediate node and the second node.

Alternatively, one of the first node and the second node is a synchronization initiating node, and the other one is a synchronization response node;

the selection module includes:

an inquiring submodule arranged to inquire whether the synchronization response node is a visible node of node A, a first selection submodule arranged to take node A as one of the intermediate nodes and end the selection of the intermediate node if the synchronization response node is the visible node of node A;

a second selection submodule arranged to take node A as one of the intermediate nodes and take the visible node of node A as the next node A to be returned to the inquiring submodule if the synchronization response node is the invisible node of node A;

herein the visible node of the synchronization initiating node is the first node A.

Alternatively, each node corresponds to one synchronization level; the synchronization level is equal to the minimum number of the passed segments of the visible paths from the node to a clock reference point;

the second selection submodule is arranged to take the visible node of node A whose synchronization level is lower than that of node A as the next node A to be returned to the inquiring submodule, when the synchronization level of the synchronization initiating node is higher than that of the synchronization response node;

the second selection submodule is arranged to take the visible node of node A whose synchronization level is higher than that of node A as the next node A to be returned to the inquiring submodule, when the synchronization level of the synchronization initiating node is lower than that of the synchronization response node.

Alternatively, one of the first node and the second node is the synchronization initiating node, and the other one is the synchronization response node;

the selection module includes:

a storage submodule arranged to obtain a set of visible nodes of each node in advance;

a determination submodule arranged to inquire the synchronization response node in the set of visible nodes and determine the intermediate node.

Alternatively, the judgment module is arranged to inquire the set of visible nodes of the first node, and determine the second node as the visible node of the first node when the second node is the node in the set of visible nodes.

Alternatively, the synchronization module is arranged to allow the intermediate node to use the visible path to synchronize with the first node, when the synchronization path passes through only one intermediate node; the second node uses the visible path to synchronize with the intermediate node; or, the first node and the second node uses the visible path to be synchronized with the assistance of the intermediate node;

the synchronization module is arranged to allow the intermediate node to use the visible path to synchronize with the first node when the synchronization path passes through at least two intermediate nodes; the intermediate node uses the visible path to synchronize with each other; and the second node uses the visible path to synchronize with the intermediate node.

Alternatively, one of two nodes that use the visible path for synchronization is a synchronized node, and the other one is a node to be synchronized;

the synchronization module is arranged to determine a synchronization time, obtain an arrival time of a synchronization message sent by the synchronized node to the node to be synchronized and an arrival time of the synchronization message sent by the node to be synchronized to the synchronized node, and allow the node to be synchronized and the synchronized node to synchronize with each other according to the two arrival times;

or the synchronization module is arranged to determine the synchronization time, allow node n−1 and node n+1 to send the synchronization message to node n respectively, obtain the arrival times of the synchronization messages sent by node n−1 and node n+1 to node n respectively, calculate a clock difference between node n−1 and node n+1 according to the arrival times, and synchronize the node to be synchronized with the synchronized node according to the clock difference;

herein node n−1 and node n are the nodes visible to each other; node n and node n+1 are the nodes visible to each other; node n+1 is an invisible node of node n−1.

Alternatively, the synchronization level of node n−1 is lower than that of node n; the synchronization level of node n is lower than that of node n+1; node n+1 is the node to be synchronized; node n−1 is the synchronized node.

The third aspect of the embodiment of the present document provides a computer storage medium that stores a computer program therein, the computer program being used for executing at least one of the methods according to the first aspect of the embodiment of the present document.

The wireless synchronization method and the wireless synchronization system described in the embodiments of the present document first determine the synchronization path during synchronization and use the synchronization path to synchronize the two nodes, so as to avoid the problem of less accurate synchronization caused by interference of a shelter to the synchronization signal, and thus obtain the advantage of high accuracy synchronization. In addition, the invention adopts the third-order auxiliary synchronization between the nodes that cannot be directed, which further reduces the error accumulation and improves the synchronization precision.

DETAILED EMBODIMENTS OF THE INVENTION

Embodiments of the present document will now be described in detail with reference to the accompanying drawings. It is to be understood that the preferred embodiments set forth below are merely for illustration and explanation of the present document and are not intended to limit the present document.

Embodiment 1

Figure 1:
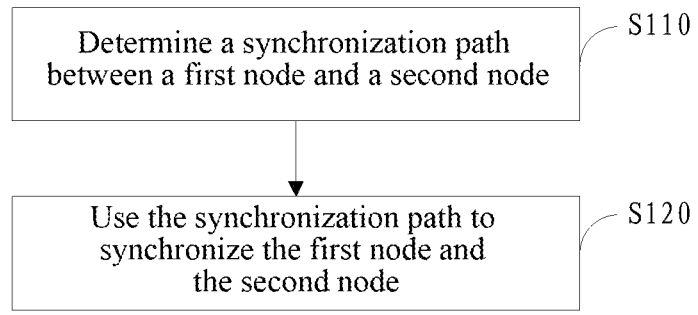
FIG. 1 is a flow diagram of a wireless synchronization method of an embodiment of the present document.

As shown in FIG. 1, embodiment 1 provides a wireless synchronization method, including:

in step S110, a synchronization path between a first node and a second node is determined; and in step S120, the synchronization path is used to synchronize the first node and the second node;

herein the synchronization path is composed of one or more segments of visible paths;

the visible path is a direct path which connects two nodes visible to each other.

In the prior art, the first node and the second node are directly synchronized by wireless transmission technology; in the process of signal synchronization, reflection and multipath phenomena may occur in the transmission of a synchronization signal due to topographical factors such as buildings and the high ground, leading to a delayed arrival of the synchronization signal and further leading to insufficient synchronization accuracy. In embodiment 1, it is first to determine the synchronization path when performing the synchronization of the first node and the second node, the synchronization path is composed of one or more segments of the visible paths; when the visible path is used to transmit the synchronization signal or the synchronization message, the terrains such as buildings and the high ground will not cause an actual delay of the synchronization signal due to the reflection and multipath phenomena occurred in the synchronization signal or the synchronization message, thereby improving synchronization accuracy.

When the second node is a visible node of the first node, the first node is also a visible node of the second node, the synchronization path is composed of one segment of the visible path at this time, and this segment of the visible path is composed of a wireless path connecting the first node and the second node.

When the second node is an invisible node of the first node, the synchronization path is composed of two segments of the visible paths connecting the first node, at least one intermediate node and the second node; the synchronization path is composed of at least two segments of the visible paths at this time, herein the intermediate node is a communication node in the synchronization path for assisting the first node and the second node to be synchronized; generally, in the communication path, the synchronization path connects the first node, the intermediate node and the second node in sequence, or connects the second node, the intermediate node and the first node in sequence. Generally, in terms of a physical position, the intermediate node may also be positioned between the first node and the second node.

Figure 2:
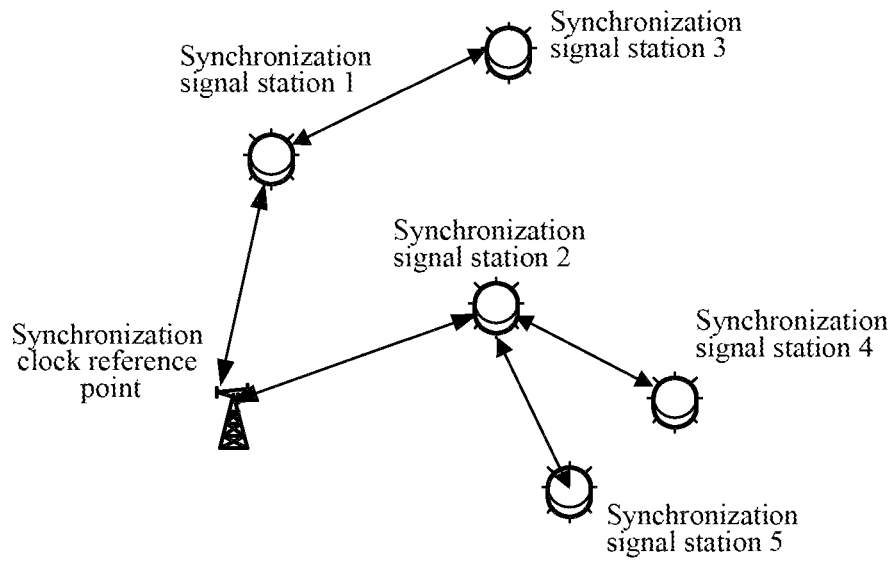
FIG. 2 is a structural diagram of a wireless synchronization system of an embodiment of the present document.

A wireless synchronization system as shown in FIG. 2 includes several nodes, in particular, for example, a clock reference station, a synchronization signal station 1, a synchronization signal station 2, a synchronization signal station, a synchronization signal station 4 and a synchronization signal station 5; an arrow shown in FIG. 2 represents one segment of the visible path; two nodes connected at two ends of the visible path are the nodes visible to each other. The two nodes visible to each other may form a direct path therebetween which is not sheltered by the terrain factors such as buildings and the high ground, the direct path is the visible path.

If the synchronization signal station 3 is the first node, the synchronization signal station 1 is the second node, and the synchronization signal station 3 and the synchronization signal station 1 may form the visible path therebetween, then the synchronization path between the synchronization signal station 3 and the synchronization signal station 1 is the visible path connecting the synchronization signal station 3 and the synchronization signal station 1. If the synchronization signal station 3 is the first node and the synchronization clock reference point is the second node, then the synchronization path connecting the synchronization signal station 3 and the synchronization clock reference point is composed of the visible path between the synchronization clock reference station and the synchronization signal station 1 and the visible path between the synchronization signal station 1 and the synchronization signal station 3.

In particular, there is a plurality of methods for determining the synchronization path, one method is provided in the following:

step S110 includes:

judging whether the second node is the visible node of the first node;

if so, the synchronization path is composed of a visible path connecting the first node and the second node.

The first node knows which nodes are visible nodes of the first node in advance, in particular, for example, the visible node of the first node is stored in a storage medium of the first node in the form of a set of visible nodes, therefore, whether the second node is the visible node of the first node may be known through inquiring the set of visible nodes. In particular, as shown in FIG. 2, the synchronization signal station 2, when taken as the first node, has stored a set of visible nodes in advance, herein the visible node and the first node are nodes visible to each other. That is, the synchronization signal station 2 stores identification marks of the synchronization signal station 4, the synchronization clock reference point and the synchronization signal station 5 in advance. The identification mark may be a node address, a node serial number or other information with an identification function.

Alternatively, the method further includes:

when the path is composed of at least two segments of the visible paths connecting the first node, at least one intermediate node and the second node, determining the synchronization path between the first node and the second node further includes:

a step of selecting the intermediate node.

Figure 3:
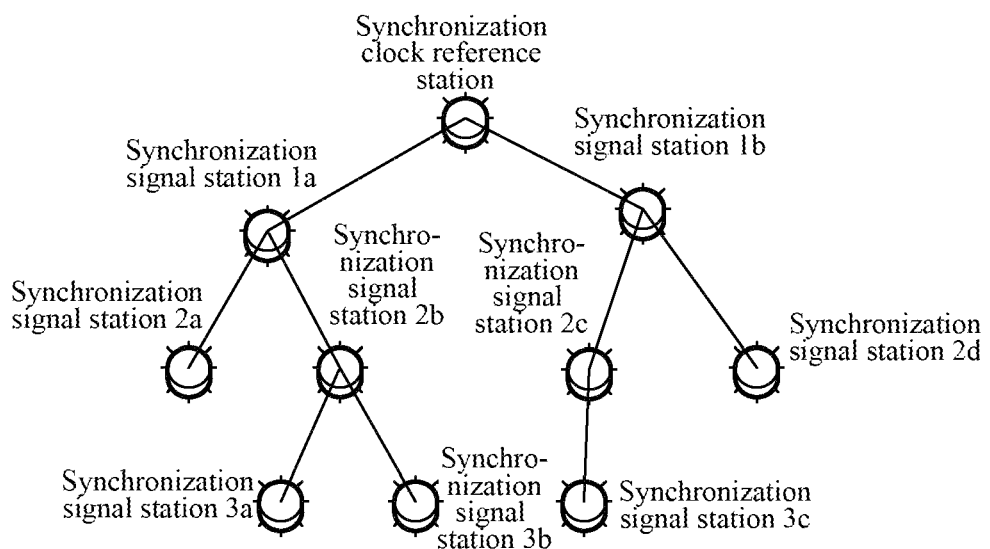
FIG. 3 is a structural diagram of a wireless synchronization system of an embodiment of the present document.

As shown in FIG. 3, the wireless synchronization system includes several nodes therein, in particular, for example, the synchronization clock reference station, a synchronization signal station 1a, a synchronization signal station 1b, a synchronization signal station 2a, a synchronization signal station 2b, a synchronization signal station 2c, a synchronization signal station 2d, a synchronization signal station 3a, a synchronization signal station 3b, and a synchronization signal station 3c.

A straight line in FIG. 3 represents a visible path; two nodes connected by the straight line are nodes visible to each other.

If the synchronization signal station 3b is the first node at this time, the synchronization signal station 1a is the second node, there is no visible path between the first node and the second node, the synchronization path is composed of a plurality of segments of the visible paths at this time, furthermore, the intermediate node participates in the synchronization between the first node and the second node. The synchronization signal station 2b will participate in the synchronization between the synchronization signal station 3b and the synchronization signal station 1a as the intermediate node. When determining the synchronization path, the method further includes a step of determining the synchronization signal station 2b as the intermediate node.

In a specific implementation process, the synchronization between the nodes is synchronization implemented from a node with low clock accuracy to a node with high clock accuracy. The synchronization clock reference stations described in FIG. 2 and FIG. 3 are generally the node with the highest clock accuracy. When the synchronization is being performed, generally, the node with the low clock accuracy is taken as a synchronization initiating point to request to be synchronized with the node with the high clock accuracy, at this time, the node with the high clock accuracy is a synchronization response node; in addition, the node with the high clock accuracy may also request the node with the low clock accuracy to be synchronized therewith, at this time, the node with the high clock accuracy is a synchronization initiating node, the node with the low clock accuracy is a synchronization response node.

Figure 4:
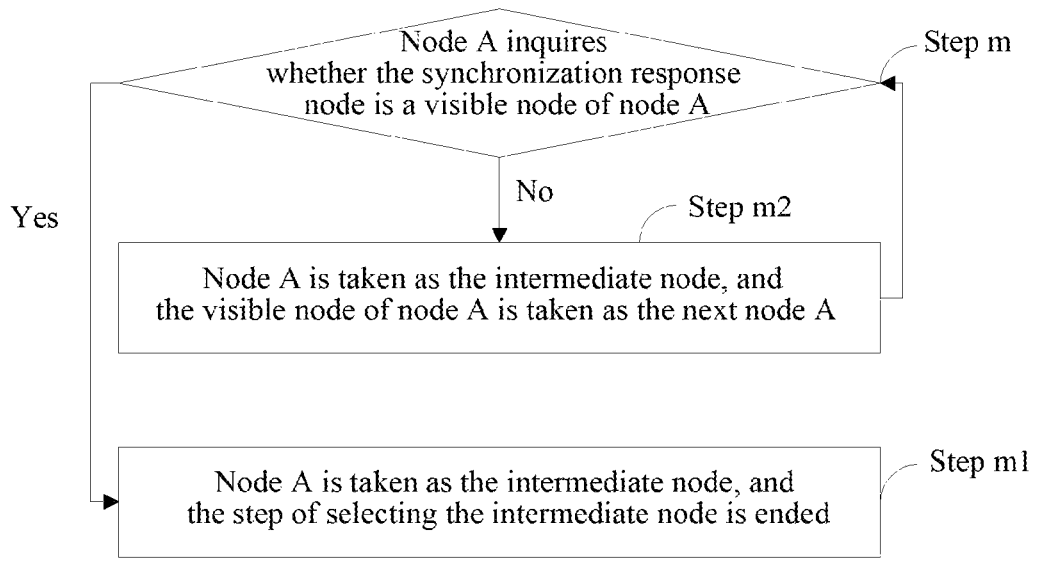
FIG. 4 is a flow diagram of determining a synchronization path of an embodiment of the present document.

In the specific implementation process, the method for selecting the intermediate node includes at least two following methods:

The first method: as shown in FIG. 4, the step of selecting the intermediate node includes:

in step m, node A inquires whether the synchronization response node is a visible node of node A, if the synchronization response node is the visible node of node A, the method enters step m1; if the synchronization response node is an invisible node of node A, the method enters step m2;

in step m1, node A is taken as the intermediate node, and the step of selecting the intermediate node is ended;

in step m2, node A is taken as the intermediate node, and the visible node of node A whose level is low is taken as the next node A to be returned to step m;

herein the visible point of the synchronization initiating node is taken as the first node A.

When the first step m in selecting the intermediate node is performed, since the node is the synchronization initiating node, when there is no synchronization response node in the visible node of the synchronization initiating node, node A is the synchronization initiating node at this time, if other nodes except than the synchronization initiating node are taken as node A, this node A is the intermediate node.

In the selection method, each node may only store its own set of visible nodes; in particular, as shown in FIG. 3, if the synchronization initiating node is the synchronization signal station 3b, and the synchronization response node is the synchronization clock reference station, then the synchronization signal station 3b is first taken as node A to inquire whether its own visible node includes the synchronization response node, the inquiring result does not include: the synchronization signal station 3b is the synchronization initiating node, the synchronization signal station 2b of the visible node of the synchronization signal station 3b is taken as the next node A to inquire, at this time, the synchronization signal station 3b may send the identification mark of the synchronization response node to the synchronization signal station 2b; the synchronization signal station 2b inquires whether its visible node includes the synchronization response node; the inquiring result does not include: the synchronization signal station 2b is one of the intermediate nodes, and the synchronization signal station 1a is taken as the next node A to inquire, the synchronization signal station 1a, through inquiring its visible node, finds that the synchronization response node is its visible node, the synchronization signal station 1a is also one of the intermediate nodes.

It is finally determined that the nodes through which the synchronization path passes include the synchronization clock reference station, the synchronization signal station 1a, the synchronization signal station 2b and the synchronization signal station 3a. In the specific implementation process, the synchronization signal station 3a may also be connected to the synchronization clock reference station through other nodes, when the synchronization signal station 2b determines the synchronization response node as its invisible node, the synchronization signal station 3a may also be taken as the next node A to select the intermediate node. In the specific implementation process, there may be more than one synchronization paths, when selection is being performed, the synchronization path having the minimum data of the intermediate node may be selected, the node with a lower synchronization level may also be alternatively selected as the next node A, so that the synchronization level of the selected intermediate node is lower. Generally, a lower synchronization level indicates a higher clock accuracy of the node and a higher reliability, if the synchronization level of the synchronization clock reference station may be 0, the synchronization level of the node can be represented according to the number of the segments of the visible path included in the synchronization path formed with the synchronization clock reference station. In particular, for example, the synchronization level of the synchronization signal station 1a is obtained by adding 1 to the synchronization level of the clock reference station, i.e. 1; the synchronization level of the synchronization signal station 2b is obtained by adding 1 to the synchronization level of synchronization signal station 1a, i.e. 2.

The synchronization level of one node may be obtained through the calculation of adding 1 to the synchronization level of the node with the lowest synchronization level in its visible nodes.

In the embodiment, each node corresponds to one synchronization level; the synchronization level is equal to the minimum number of the passed segments of the visible paths from the node to the clock reference point; if the synchronization level is lower, the number of the segments of the visible paths from the node to the clock reference station is the least, generally, the corresponding clock is more accurate;

when the synchronization level of the synchronization initiating node is higher than that of the synchronization response node, in step m2, the visible node of node A whose synchronization level is lower than that of node A is taken as the next node A to be returned to step m;

when the synchronization level of the synchronization initiating node is lower than that of the synchronization response node, in step m2, the visible node of node A whose synchronization level is higher than that of node A is taken as the next node A to be returned to step m.

With this method, when the visible node of node A does not include the synchronization response node, the node whose synchronization level is the highest or the lowest in the visible nodes of node A is taken as the next node A, reducing an inquiring operation of the synchronization response node and reducing the steps including retransmission of the identification mark of the synchronization response node.

The Second Method:

one of the first node and the second node is a synchronization initiating node, and the other one is a synchronization response node;

the step of selecting the intermediate node includes:

obtaining by the synchronization initiating node a set of visible nodes of each node in advance;

inquiring the synchronization response node in the set of visible nodes, and determining the intermediate node.

The obtaining of the set of visible nodes of each node in advance may be two nodes visible to each other transmitting their sets of visible nodes to each other, and transmitting the set of visible nodes that receive other nodes to each other, so that each node may obtain a topological graph of the visible path formed by the whole wireless synchronization system or synchronization network through this transmission. One or more synchronization paths may be determined at the synchronization initiating node through the topological graph, so the intermediate node is determined. When there is a plurality of synchronization paths, one path may be selected according to a selection strategy of the synchronization path, for example, strategies such as a principle of taking the number of the intermediate nodes as priority or a principle of taking the lowest synchronization level of the intermediate node as priority, or the like. With the principle of taking the number of the intermediate nodes as priority, the number of the intermediate nodes passed by the selected synchronization path is the least, and the number of the segments of the visible paths included in the synchronization path is the least. With the principle of taking the lowest synchronization level as priority, when the intermediate node is being selected, the intermediate node whose synchronization level is the lowest is alternatively selected. In a specific implementation process, one manner may be selected according to requirements.

In particular, there is a plurality of manners for determining whether the second node is the visible node of the first node, the following manner is alternatively selected in the embodiment:

the set of visible nodes of the first node are inquired; and the second node is determined to be the visible node of the first node when the second node is the node in the set of visible nodes.

Employing the above manner to judge whether the second node is the visible node of the first node has advantages of simplicity and fastness.

There is a plurality of manners for specifically implementing the synchronization of the first node and the second node in step S120, the following manner is alternatively selected in the embodiment:

when the synchronization path passes through only one intermediate node, using the synchronization path to synchronize the first node and the second node includes:

the intermediate node using the visible path to synchronize with the first node; the second node using the visible path to synchronize with the intermediate node; or the first node and the second node using the visible path to be synchronized with the assistance of the intermediate node;

when the synchronization path passes through at least two intermediate nodes, using the synchronization path to synchronize the first node and the second node includes:

the intermediate node using the visible path to synchronize with the first node;

the intermediate nodes using the visible path to synchronize with each other; and the second node using the visible path to synchronize with the intermediate node.

In particular, in FIG. 3, if the synchronization signal station 1a synchronizes with the synchronization signal station 3b, the formed synchronization path passes through the synchronization signal station 2b of the intermediate node, at this time, the synchronization signal station 2b may synchronize with the synchronization signal station 1a first, then the synchronization signal station 3b synchronizes with the synchronization signal station 2b, realizing the indirect synchronization of the synchronization signal station 3b with the synchronization signal station 1a. Otherwise, the synchronization signal station 1a and the synchronization signal station 3b each may send synchronization information to the synchronization signal station 2b of the intermediate node, the synchronization signal station 2b measures an arrival time of a synchronization signal respectively, then a clock difference between the synchronization signal station 1a and the synchronization signal station 3b is calculated according to the arrival time and sent to the synchronization signal station 3b; the synchronization signal station 3b uses the clock difference to perform the synchronization; or the synchronization signal station 2b directly sends the arrival times of the two pieces of the synchronization information that reach the synchronization signal station 2b to the synchronization signal station 3b; the synchronization signal station 3b calculates the clock difference from the synchronization signal station 1a by itself, and performs clock correction according to the calculated clock difference, so as to realize the synchronization with the synchronization signal station 1a.

At this time, if the synchronization signal station 3b intends to be synchronize with a synchronization clock reference station, the synchronization path passes through the synchronization signal station 1a and the synchronization signal station 2b; at this time, the synchronization signal station 1a firstly needs to synchronize with the synchronization clock reference station, the synchronization signal station 2b synchronizes with the synchronization signal station 1a, and finally the synchronization signal station 3b synchronizes with the synchronization signal station 2b. The synchronization signal station 3b indirectly synchronizes with the synchronization clock reference station through the synchronization signal station 2b and the synchronization signal station 1a.

There is also a plurality of methods for wireless synchronization between two nodes, two manners with simple implementation are provided in the following:

The First Method:

one of two nodes that use the visible path for synchronization is a synchronized node, and the other one is a node to be synchronized;

using the visible path to synchronize the two nodes includes:

determining a synchronization time;

sending by the node to be synchronized a synchronization message to the synchronized node;

receiving by the node to be synchronized an arrival time of the synchronization message;

measuring by the node to be synchronized the arrival time of the synchronization message sent by the synchronized node; and synchronizing the node to be synchronized with the synchronized node according to the two arrival times.

Figure 5:
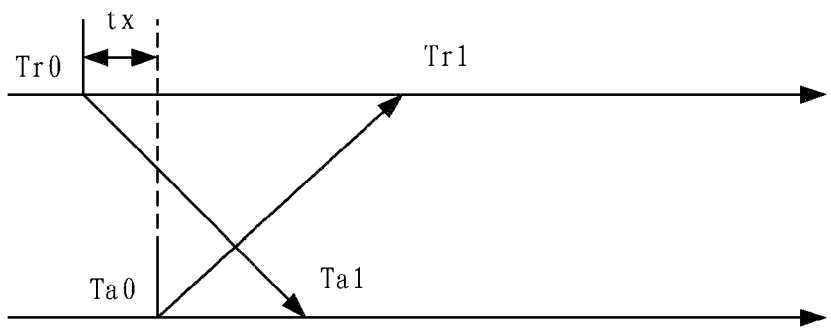
FIG. 5 is a diagram of a receiving/sending timing of a synchronization message of an embodiment of the present document.

As shown in FIG. 3 and FIG. 5, if the synchronization signal station 1a is the node to be synchronized, the synchronization signal reference station is the synchronized node, using the visible path to synchronize the two nodes may includes the following steps:

in step 1, the synchronization signal station 1a negotiates with the synchronization reference station to determine the synchronization time. For example, the closest 20 ms pulse is taken as the synchronization time. It is assumed that the time that the closest 20 ms pulse lasts in the station 1a is $T_{r0}$, and the time that it lasts in the clock reference station is $T_{r0}$;

in step 2, the synchronization signal station 1a sends the synchronization message to the synchronization reference station at the synchronization time; and the synchronization reference station sends the synchronization message to the synchronization signal station 1a at the synchronization time;

in step 3, the synchronization signal station 1a measures an arrival time of the synchronization message sent by the synchronization reference station, it is assumed that the measured arrival time is $T_{a1}$;

in step 4, a measuring module of the synchronization reference station measures the arrival time of the synchronization message sent by the synchronization reference station 1a, it is assumed that the measured arrival time is $T_{r1}$;

in step 5, the synchronization signal station 1a receives $T_{r1}$ sent by the synchronization reference station;

in step 6, the synchronization signal station 1a may calculate a clock difference between the synchronization signal station 1a and the synchronization clock reference station through the following equations:

$$\begin{cases} T_{r1} = T_{r0} + T_x + l/C \\ T_{a1} = T_{a0} - T_x + l/C \end{cases}$$

$$T_{a1} - T_{r1} = T_{a0} + l/C - (T_{r0} + l/C) - 2t_x = T_{a0} - T_{r0} - 2t_x$$

$$t_x = T_{a0} - T_{r0}$$

$$T_{a1} - T_{r1} = t_x - 2t_x = -t_x$$

herein $T_{r1}$ is the time when the synchronization clock reference station receives the synchronization message sent by the synchronization signal station 1a, $T_{r0}$ is the time when the synchronization reference station sends the synchronization message. $t_x$ is the time difference between $T_{r0}$ and $T_{a0}$ (i.e. a clock difference between two points). l is a straight-line distance between the synchronization signal station 1a and the synchronization clock reference station (the straight-line distance may be calculated according to coordinates of the positions of the synchronization reference station and the synchronization signal station 1a), C is the speed of light.

in step 7, a clock of the synchronization signal station 1a is corrected according to the clock difference and the synchronization between the synchronization signal station 1a and the synchronization clock reference station is realized.

The second method: a synchronization time is determined;

node n−1 and node n+1 send a synchronization message to node n respectively;

node n measures the arrival time of the synchronization message sent by node n−1 and node n+1 respectively;

node n calculates a clock difference between node n−1 and node n+1 according to the arrival time;

node n sends the clock difference to a node to be synchronized; and the node to be synchronized synchronizes with the synchronized node according to the clock difference;

herein node n−1 and node n are the nodes visible to each other; node n and node n+1 are the nodes visible to each other; node n+1 is an invisible node of node n−1.

In the method, node n, node n−1 and node n+1 represent different nodes.

Figure 6:
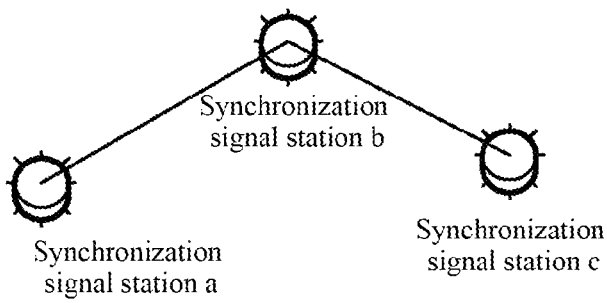
FIG. 6 is a structural diagram of a wireless synchronization system of an embodiment of the present document.
Figure 7:
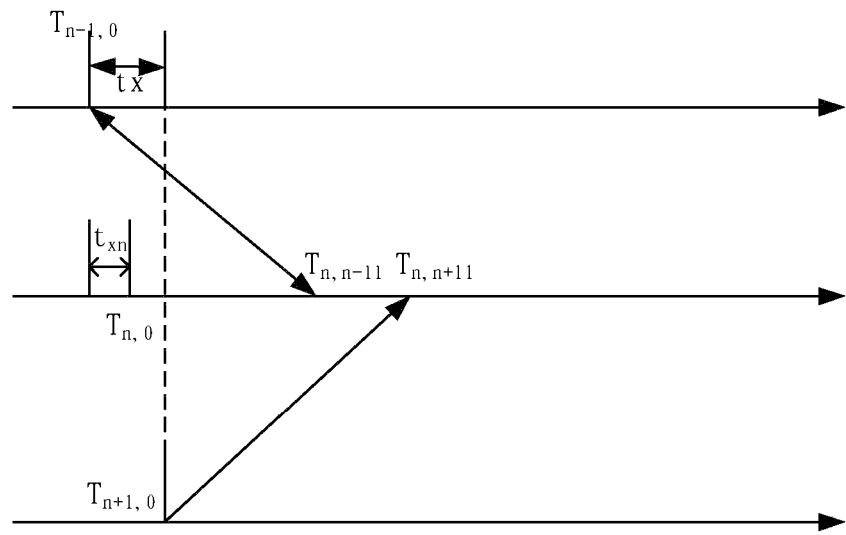
FIG. 7 is a diagram of a receiving/sending timing of a synchronization message of an embodiment of the present document.

In particular, as shown in FIG. 6 and FIG. 7, a wireless synchronization system includes three synchronization signal stations, which are a synchronization signal station a, a synchronization signal station b and a synchronization signal station c, respectively. It is assumed that there is a visible path between the synchronization signal station a and the synchronization signal station b; there is the visible path between the synchronization signal station b and the synchronization signal station c; and there is no visible path between the synchronization signal station a and the synchronization signal station c due to the sheltering of a building.

In a specific implementation process, all nodes in the synchronization path may be synchronized with the first method independently, or may all be synchronized with the second method or may be synchronized using a combination of the two methods.

The synchronization signal station c and the synchronization signal station a are synchronized using the visible path, in which the following three-level auxiliary wireless synchronization method may be used. The specific steps are as follows:

in step 1, the synchronization signal station a, the synchronization signal station b and the synchronization signal station c negotiate through a communication interface to determine the synchronization time. For example, the closest 20 ms pulse is taken as the synchronization time. It is assumed that the time the closest 20 ms pulse lasts in the station a is $T_{n-1,0}$ the time that it lasts in the station b is $T_{n,0}$ and the time that it lasts in station c is $T_{n+1,0}$;

in step 2, the synchronization signal station a sends the synchronization message to the synchronization signal station b at the synchronization time; the synchronization signal station c sends the synchronization message to the synchronization signal station b at the synchronization time;

in step 3, the synchronization signal station b measures the arrival time of the synchronization message sent by the synchronization signal station a, the measurement result is $T_{n,n-11}$; the synchronization signal station b measures the arrival time of the synchronization message sent by the synchronization signal station c, the measurement result is $T_{n,n+11}$;

in step 4: the synchronization signal station b calculates the clock difference between the synchronization signal station a and the synchronization signal station b according to the following equations:

$$\begin{cases} T_{n,n-11} = T_{n-1,0} + l_{n-1}/C = T_{n,0} - t_{xn} + l_{n-1}/C \\ T_{n,n+11} = T_{n+1,0} + l_{n+1}/C = T_{n,0} + t_x - t_{xn} + l_{n+1}/C \end{cases}$$

$$T_{n,n+11} - T_{n,n-11} = t_x + (l_{n+1} - l_{n-1})/C$$

$$t_x = T_{n,n+11} - T_{n,n-11} - (l_{n+1} - l_{n-1})/C$$

herein $t_x$ is the clock difference between the synchronization signal station a and the synchronization signal station c; $t_{xn}$ is the clock difference between the synchronization signal station a and the synchronization signal station b; $l_{n-1}$ is the distance between the synchronization signal station a and the synchronization signal station b; $l_{n+1}$ is the distance between the synchronization signal station a and the synchronization signal station b, C is the speed of light.

in step 5, the synchronization signal station b sends the calculated clock difference to the synchronization signal station c of the node to be synchronized; the node to be synchronized c corrects its inner clock according to the clock difference and completes the synchronization with the synchronization signal station a of the synchronized node.

The above method may reduce stepwise accumulation of synchronization errors and improve synchronization accuracy again.

In the specific implementation process, generally, the synchronization level of the synchronization signal station b is lower than that of the synchronization signal station c; the synchronization level of the synchronization signal station b is lower than that of the synchronization signal station a; that is, the synchronization level of node n is between the synchronization level of node n−1 and the synchronization level of node n+1.

In summary, the wireless synchronization method of the embodiment first selects the synchronization path when the synchronization is being performed. The problem of poor synchronization accuracy due to a transmission distance being bigger than the distance between nodes caused by transmission multipath and reflection phenomena of a synchronization signal resulted from topographical factors such as buildings and mountains in a transmitting path of the synchronization signal, is better solved, thereby improving the synchronization accuracy.

Embodiment 2

Figure 8:
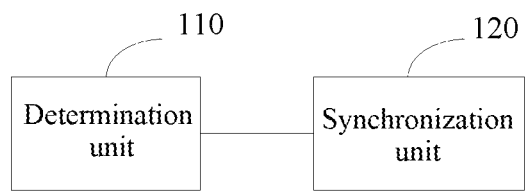
FIG. 8 is a structural diagram of a wireless synchronization system of an embodiment of the present document.

As shown in FIG. 8, embodiment 2 provides a wireless synchronization system, including:

a determination unit 110 arranged to determine a synchronization path between a first node and a second node; and a synchronization unit 120 arranged to use the synchronization path to synchronize the first node and the second node;

herein the synchronization path is composed of one or more segments of visible paths;

the visible path is a direct path which connects two nodes visible to each other.

In a specific implementation process, a specific structure of the determination unit 110 may be a processor and a storage medium; the storage medium stores an executable instruction of the processor thereon; the processor reads and executes the executable instruction via a communication interface, a data bus or other structures to determine a synchronization path of the first node and the second node. The processor described in embodiment 2 may be an electronic element having a processing function such as a microprocessor, a central processor, a microcontroller, a digital signal processor, or a programmable logic array.

A specific structure of the synchronization unit 120 may include a wireless communication interface. The communication interface may specifically be a transceiver antenna or a transceiver antenna array, and a synchronization signal and/or a synchronization message may be transmitted through the synchronization path to perform synchronization between the first node and the second node.

In the specific implementation process, the synchronization unit 120 is a component located on the first node and/or the second node; the determination unit 110 may be a structure separated from the first node and/or the second node, or may be a constituent part of the first node and/or the second node.

For example, when the synchronization unit 120 and the determination unit 110 are located on the first node or the second node, the determination unit 110 may determine the synchronization by inquiring a set of visible nodes of each node stored on a storage medium of the node; the synchronization unit can synchronize the first node and the second node by transmitting and receiving the synchronization signal, measuring the transmitting and receiving times of the synchronization signal, calculating the time difference of the synchronization signal, correcting the time of the clock and other actions. In the specific implementation process, the synchronization unit 120 may also include a timer, a calculator and other structures.

In the specific implementation process, the wireless synchronization system may also be specially provided with one determination network element of the synchronization path that stores a set of visual nodes of each communication node, when the first node needs to be synchronized with the second node, an identification mark of the second node, such as a communication mark or a communication address of the second node, can first be sent to the determination network element of the synchronization path through the communication interface; after obtaining the addresses of the first node and the second node, the determination network element of the synchronization path inquires the set of visual nodes of each communication node to determine the synchronization path and then returns it to the first node or the second node; the first node performs synchronization using the synchronization path.

The determination network element of the synchronization path may be a network apparatus provided in the wireless synchronization system, and the network apparatus is connected by a wired or wireless manner to realize the transmission of a determination request of the synchronization path and a determination response of the synchronization path.

Alternatively, the determination unit 110 includes:

a judgment module arranged to judge whether the second node is a visible node of the first node;

the specific structure of the judgment module may be the processor and the storage medium; the medium stores the set of visible nodes of the first node; the processor compares and matches the second node with each node in the set of visible nodes, and judges whether the second node is the visible node of the first node according to a matching result. The physical structure of the first determination module may also be the processor, and the synchronization path is determined according to the judgment result of the judgment module;

the first determination module arranged to determine that the synchronization path is composed of the visible path connecting the first node and the second node when the second node is the visible node of the first node, and determine that the synchronization path is composed of at least two segments of the visible paths connecting the first node, at least one intermediate node and the second node, when the second node is the invisible node of the first node.

The determination unit further includes:

a selection module arranged to perform a step of selecting the intermediate node when the path is composed of at least two segments of the visible paths connecting the first node, at least one intermediate node and the second node; and the first determination module further arranged to determine the synchronization path according to the intermediate node selected by the selection module.

Alternatively, one of the first node and the second node is a synchronization initiating node, and the other one is a synchronization response node.

Figure 9A:
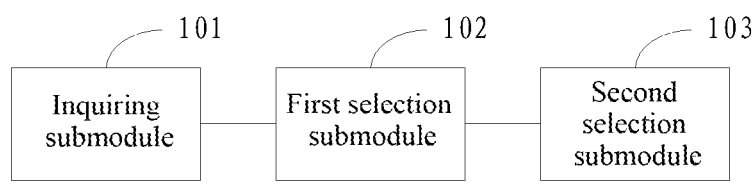
FIG. 9a is a first structural diagram of a selection module of an embodiment of the present document.

There is a plurality of structures for the selection unit, the following two structures are provided:

The first structure: as shown in FIG. 9a, the selection module includes:

an inquiring submodule 101 arranged to inquire whether the synchronization response node is a visible node of node A, a first selection submodule 102 arranged to take node A as the intermediate node and end the selection of the intermediate node if the synchronization response node is the visible node of node A;

a second selection submodule 103 arranged to take node A as the intermediate node and take the visible node of node A as the next node A to be returned to the inquiring submodule if the synchronization response node is the invisible node of node A;

herein the visible node of the synchronization initiating node is taken as the first node A.

The inquiring submodule, the first selection submodule and the second selection submodule may correspond to a processor, may correspond to different processors respectively and may integrally correspond to the same processor; when they integrally correspond to the same processor, the functions of different submodules can be realized by the processor with different threads or a time-division multiplexing manner.

Alternatively, each node corresponds to one synchronization level; the synchronization level is equal to the minimum number of the passed segments of the visible paths from the node to a clock reference point; generally, the lower the synchronization level is, the more accurate a clock of the node is;

the second selection submodule is arranged to take the visible node of node A whose synchronization level is lower than that of node A as the next node A to be returned to the inquiring submodule, when the synchronization level of the synchronization initiating node is higher than that of the synchronization response node;

the second selection submodule is arranged to take the visible node of node A whose synchronization level is higher than that of node A as the next node A to be returned to the inquiring submodule, when the synchronization level of the synchronization initiating node is lower than that of the synchronization response node.

Figure 9B:
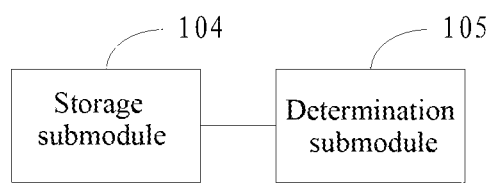
FIG. 9b is a second structural diagram of a selection module of an embodiment of the present document.

The second structure: as shown in FIG. 9b, the selection module includes:

a storage submodule 104 arranged to obtain the set of visible nodes of each node in advance;

a determination submodule 105 arranged to inquire the synchronization response node in the set of visible nodes and determine the intermediate node.

The storage submodule may be a storage medium, alternatively a non-transient storage medium, such as a ROM or the like. The hardware structure of the determination submodule may be a processor.

When the selection module adopts the first structure, the selection unit includes several inquiring submodules, several first selection submodules and several second selection submodules; generally, one inquiring submodule, one first selection submodule and one second selection submodule are distributed on one node; different nodes trigger the next node to inquire the synchronization response node through information interaction.

When the selection unit adopts the first structure, the selection unit may also only include one inquiring submodule, one first selection submodule and one second selection submodule; these submodules are located on one node or one network element.

When the selection unit adopts the second structure, the constituent part storage submodule and the determination submodule of the selection unit are alternatively located in one network element or one node, which is convenient to quickly determine the synchronization path.

Alternatively, the judgment module is arranged to inquire the set of visible nodes of the first node; and determine the second node as the visible node of the first node when the second node is the node in the set of visible nodes.

When the synchronization path passes through only one intermediate node, the synchronization module is arranged to allow: the intermediate node to use the visible path to synchronize with the first node; the second node to use the visible path to synchronize with the intermediate node; or the first node and the second node to use the visible path to be synchronized with the assistance of the intermediate node.

When the synchronization path passes through at least two intermediate nodes, the synchronization module is arranged to allow: the intermediate node to use the visible path to synchronize with the first node; the intermediate nodes to use the visible path to synchronize with each other; and the second node to use the visible path to synchronize with the intermediate node, or is arranged to allow the first node and the second node to use the visible path to be synchronized with the assistance of the intermediate node.

The synchronization module is different according to the different structure of the synchronization path, the synchronization module may be composed of synchronization structures located at different nodes, or may be a synchronization structure located only in a node to be synchronized.

Alternatively, one of two nodes that use the visible path to be synchronized is a synchronized node, and the other one is the node to be synchronized;

the synchronization module is arranged to determine a synchronization time, obtain an arrival time of a synchronization message sent by the synchronized node to the node to be synchronized, and an arrival time of the synchronization message sent by the node to be synchronized to the synchronized node, and synchronize the node to be synchronized with the synchronized node according to the two arrival times;

or the synchronization module is arranged to determine the synchronization time, allow node n−1 and node n+1 to send the synchronization message to node n respectively, obtain the arrival times of the synchronization messages sent by node n−1 and node n+1 that reach node n respectively; calculate a clock difference between node n−1 and node n+1 according to the arrival times; and synchronize the node to be synchronized with the synchronized node according to the clock difference;

herein node n−1 and node n are the nodes visible to each other; node n and node n+1 are the nodes visible to each other; node n+1 is an invisible node of node n−1.

The synchronization module may include a communication interface for implementing negotiation for determination of a synchronization time between nodes at two ends of any visible path among the first node, the intermediate node and the second node through various signaling, so as to transmit and receive synchronization information. The synchronization module may also include a timer arranged to time the receiving and sending time of the synchronization message. The synchronization module may also include a processor to adjust a clock in the node to be synchronized according to a timing result of the timer.

To further improve the synchronization accuracy, in embodiment 2 and alternatively, the synchronization level of node n−1 is lower than that of node n; the synchronization level of node n is lower than that of node n+1; node n+1 is the node to be synchronized; node n−1 is the synchronized node.

In view of the above, the wireless synchronization system according to embodiment 2 provides a specific hardware support for the wireless synchronization method as described in embodiment 1, which can be used for realizing any technical solution described in embodiment 1, and also has high accuracy and other advantages.

Embodiment 3

Embodiment 3 of the present also provides a computer storage medium that stores a computer-executable instruction, the computer-executable instruction is used for executing at least one of the methods described in embodiment 1, specifically as the method shown in FIG. 1.

The computer storage medium may be various storage media such as a removable storage apparatus, a read-only memory (ROM), a random access memory (RAM), a magnetic disk, or an optical disk which can store program codes; and further alternatively, the storage medium is a non-transient storage medium.

The above description is only for the preferred embodiments of the present document and is not intended to limit the scope of the present document. Modifications made according to the principles of the invention are to be understood as falling within the scope of the invention.

INDUSTRIAL APPLICABILITY

In the embodiments of the present document, a synchronization path formed by one or more segments of the visual paths is determined before synchronization is performed, and synchronization is performed using the synchronization path, herein the visible path is a direct path between two visual nodes; the synchronization implemented by using the visual path can avoid the problem of a delay of a synchronization signal caused by a sheltering effect of a shelter and the problem of poor synchronization accuracy; it improves the accuracy of synchronization between two nodes and can be used to improve the accuracy of the synchronization between any two nodes in a communication system.

What is claimed is:

1. A wireless synchronization method, comprising:
determining a synchronization path for clock synchronization between a first node and a second node; wherein the synchronization path for clock synchronization is composed of one or more segments of visible path, and a segment of visible path of the one or more segments of visible paths is a direct path which connects two nodes visible to each other without shelter between the two nodes; and
using the synchronization path for clock synchronization to transmit synchronization message for synchronizing the clock of the first node and the second node;
wherein one of two nodes that use the visible path for synchronization is a synchronized node, and the other one is a node to be synchronized;
using the visible path to synchronize the clock of two nodes comprises:
determining a synchronization time;
respectively sending by a node, labeled as node n−1, and a node, labeled as node n+1, the synchronization message to a node, labeled as node n; wherein the node n−1, the node n+1 and the node n are different nodes in network;
respectively measuring by the node n arrival times of the synchronization messages sent by the node n−1 and the node n+1;
calculating by the node n a clock difference between the node n−1 and the node n+1 according to the corresponding arrival times;
sending by the node n the clock difference to the node to be synchronized; and
synchronizing the node to be synchronized with the synchronized node according to the clock difference;
wherein the node n−1 and the node n are the nodes visible to each other; the node n and the node n+1 are the nodes visible to each other; the node n+1 is an invisible node of the node n−1,
wherein a synchronization level of the node n−1 is lower than a synchronization level of the node n; the synchronization level of the node n is lower than a synchronization level of the node n+1; the node n+1 is the node to be synchronized; the node n−1 is the synchronized node; the synchronization level of each node is equal to the minimum number of passed segments of visible paths from the each node to a clock reference point.

2. The method according to claim 1, wherein
determining the synchronization path for clock synchronization between the first node and the second node comprises:
judging whether the second node is a visible node of the first node;
if yes, the synchronization path for clock synchronization being composed of the segment of visible path connecting the first node and the second node.

3. The method according to claim 1, wherein
determining the synchronization path for clock synchronization between the first node and the second node comprises:

the synchronization path for clock synchronization being composed of at least two segments of the visible paths connecting the first node, at least one intermediate node and the second node, when the second node is an invisible node of the first node.

4. The method according to claim 3, wherein the method further comprises:
when the synchronization path for clock synchronization is composed of at least two segments of the visible paths connecting the first node, at least one intermediate node and the second node, determining the synchronization path for clock synchronization between the first node and the second node comprises:
a step of selecting the intermediate node.

5. The method according to claim 4, wherein
one of the first node and the second node is a synchronization initiating node, and the other one is a synchronization response node;
the step of selecting the intermediate node comprises:
selecting a visible node of the synchronization initiating node, labeled as a node A;
step m: the node A inquires whether the synchronization response node is a visible node of the node A,
if the synchronization response node is the visible node of the node A, the method proceeds to step m1; if the synchronization response node is an invisible node of the node A, the method proceeds to step m2;
step m1: the node A is taken as the intermediate node, and the step of selecting the intermediate node is ended;
step m2: the node A is taken as the intermediate node, and another visible node of the node A is selected as a next node A, returning to the step m to determine whether the next node A can be taken as another intermediate node.

6. The method according to claim 5, wherein
a synchronization level of each node is equal to the minimum number of passed segments of visible paths from the each node to a clock reference point;
when the synchronization level of the synchronization initiating node is higher than that of the synchronization response node, in the step m2, the visible node of the node A whose synchronization level is lower than that of the node A is taken as the next node A, returning to the step m;
when the synchronization level of the synchronization initiating node is lower than that of the synchronization response node, in the step m2, the visible node of the node A whose synchronization level is higher than that of the node A is taken as the next node A, returning to the step m.

7. The method according to claim 4, wherein
one of the first node and the second node is a synchronization initiating node, and the other one is a synchronization response node;
the step of selecting the intermediate node comprises:
obtaining by the synchronization initiating node a set of visible nodes of each node in advance;
inquiring the synchronization response node in the set of visible nodes, and determining the intermediate node.

8. The method according to claim 7, wherein judging whether the second node is the visible node of the first node comprises;
inquiring the set of visible nodes of the first node; and
determining that the second node is the visible node of the first node when the second node is a node in the set of visible nodes.

9. The method according to claim 7, wherein
when the synchronization path for clock synchronization passes through only one intermediate node, using the synchronization path for clock synchronization to transmit synchronization message for synchronizing the clock of the first node and the second node comprises:
the intermediate node using the visible path to synchronize with the first node; the second node using the visible path to synchronize with the intermediate node; or
the first node and the second node using the visible path to be synchronized with the assistance of the intermediate node;
when the synchronization path for clock synchronization passes through at least two intermediate nodes, using the synchronization path for clock synchronization to transmit synchronization message for synchronizing the clock of the first node and the second node comprises:
the first intermediate node of the at least two intermediate nodes using the visible path to synchronize with the first node;
one of the at least two intermediate nodes using the visible path to synchronize with another one of the at least two intermediate nodes in series;
the second node using the visible path to synchronize with the last intermediate node of the at least two intermediate nodes.

10. A wireless synchronization system, comprising hardware performing instructions stored in a non-transitory computer readable medium which executes steps in following units:
a determination unit arranged to determine a synchronization path for clock synchronization between a first node and a second node; wherein the synchronization path for clock synchronization is composed of one or more segments of visible path, and a segment of visible path of the one or more segments of visible paths is a direct path which connects two nodes visible to each other without shelter between the two nodes; and
a synchronization unit arranged to use the synchronization path for clock synchronization to transmit synchronization message for synchronizing the clock of the first node and the second node;
wherein one of two nodes that use the visible path for synchronization is a synchronized node, and the other one is a node to be synchronized;
the synchronization unit is arranged to: determine the synchronization time; allow a node, labeled as node n−1 and a node, labeled as node n+1 to send the synchronization message to a node, labeled as node n respectively; wherein the node n−1, the node n+1 and the node n are different nodes in network; obtain the arrival times of the synchronization messages sent by the node n−1 and the node n+1 to the node n respectively; calculate a clock difference between the node n−1 and the node n+1 according to the corresponding arrival times; and synchronize the node to be synchronized and the synchronized node according to the clock difference;
wherein the node n−1 and the node n are the nodes visible to each other; the node n and the node n+1 are the nodes visible to each other; the node n+1 is an invisible node of the node n−1,
wherein a synchronization level of the node n−1 is lower than a synchronization level of the node n; the synchronization level of the node n is lower than a synchronization level of the node n+1; the node n+1 is the node to be synchronized; the node n−1 is the synchronized node; the synchronization level of each node is equal to the minimum number of passed segments of visible paths from the each node to a clock reference point.

11. The wireless synchronization system according to claim 10, wherein
the determination unit comprises hardware performing instructions stored in the non-transitory computer readable medium which executes steps in following modules:
a judgment module arranged to judge whether the second node is a visible node of the first node; and
a first determination module arranged to determine that the synchronization path for clock synchronization is composed of the segment of visible path connecting the first node and the second node, when the second node is the visible node of the first node.

12. The wireless synchronization system according to claim 10, wherein
the determination unit comprises hardware performing instructions stored in the non-transitory computer readable medium which executes steps in following modules:
judgment module arranged to judge whether the second node is a visible node of the first node; and
a first determination module is arranged to determine that the synchronization path for clock synchronization is composed of at least two segments of visible paths connecting the first node, at least one intermediate node and the second node, when the second node is an invisible node of the first node.

13. The wireless synchronization system according to claim 12, wherein the determination unit further comprises hardware performing instructions stored in the non-transitory computer readable medium which executes steps in following module:
a selection module arranged to perform a step of selecting the intermediate node when the synchronization path for clock synchronization is composed of at least two segments of the visible paths connecting the first node, at least one intermediate node and the second node.

14. The wireless synchronization system according to claim 13, wherein
one of the first node and the second node is a synchronization initiating node, and the other one is a synchronization response node;
the selection module comprises hardware performing instructions stored in the non-transitory computer readable medium which executes steps in following submodules:
a first selection submodule arranged to select a visible node of the synchronization initiating node, labeled as a node A;
an inquiring submodule arranged to inquire whether the synchronization response node is a visible node of the node A,
the first selection submodule further arranged to take the node A as one of the intermediate nodes and end the selection of the intermediate node if the synchronization response node is the visible node of the node A;
a second selection submodule arranged to take the node A as one of the intermediate nodes and select another visible node of the node A as a next node A to be returned to the inquiring submodule to determine whether the next node A can be taken as another intermediate node when the synchronization response node is an invisible node of the node A.

15. The wireless synchronization system according to claim 14, wherein
a synchronization level of each node is equal to the minimum number of passed segments of the visible paths from the each node to a clock reference point;
the second selection submodule is arranged to take a visible node of the node A whose synchronization level is lower than that of the node A as the next node A to be returned to the inquiring submodule, when the synchronization level of the synchronization initiating node is higher than that of the synchronization response node;
the second selection submodule is arranged to take a visible node of the node A whose synchronization level is higher than that of node A as the next node A to be returned to the inquiring submodule, when the synchronization level of the synchronization initiating node is lower than that of the synchronization response node; or
one of the first node and the second node is the synchronization initiating node, and the other one is the synchronization response node;
the selection module further comprises hardware performing instructions stored in the non-transitory computer readable medium which executes steps in following submodules:
a storage submodule arranged to obtain a set of visible nodes of each node in advance;
a determination submodule arranged to inquire the synchronization response node in the set of visible nodes and determine the intermediate node.

16. The wireless synchronization system according to claim 15, wherein
the judgment module is arranged to inquire the set of visible nodes of the first node, and determine the second node as the visible node of the first node when the second node is a node in the set of visible nodes.

17. The wireless synchronization system according to claim 15, wherein
the synchronization unit is arranged to allow the intermediate node to use the visible path to synchronize with the first node when the synchronization path for clock synchronization passes through only one intermediate node; allow the second node to use the visible path to synchronize with the intermediate node; or allow the first node and the second node to use the visible path to synchronize with each other with the assistance of the intermediate node;
when the synchronization path for clock synchronization passes through at least two intermediate nodes, the synchronization unit is arranged to allow the first intermediate node of the at least two intermediate nodes to use the visible path to synchronize with the first node; allow one of the at least two intermediate nodes to use the visible path to synchronize with another one of the at least two intermediate node in series; and allow the second node to use the visible path to synchronize with the last intermediate node of the at least two intermediate nodes.

18. A non-transitory computer storage medium that stores a computer executable instruction therein, the computer executable instruction being executed by a processor to execute the method according to claim 1.

* * * * *